(12) United States Patent
Bortone et al.

(10) Patent No.: US 8,703,226 B2
(45) Date of Patent: Apr. 22, 2014

(54) METHOD FOR IMPROVING THE TEXTURAL ATTRIBUTES OF BAKED SNACK FOODS

(75) Inventors: Eugenio Bortone, McKinney, TX (US); Ximena Quintero-Fuentes, Flower Mound, TX (US); V. N. Mohan Rao, Plano, TX (US); William Cartwright Weller, McKinney, TX (US)

(73) Assignee: Frito-Lay North America, Inc., Plano, TX (US)

( * ) Notice: Subject to any disclaimer, the term of this patent is extended or adjusted under 35 U.S.C. 154(b) by 239 days.

(21) Appl. No.: 12/904,210

(22) Filed: Oct. 14, 2010

(65) Prior Publication Data

US 2012/0093993 A1  Apr. 19, 2012

(51) Int. Cl.
*A23L 1/217* (2006.01)

(52) U.S. Cl.
USPC ........... 426/560; 426/506; 426/514; 426/516; 426/517

(58) Field of Classification Search
USPC .......................... 426/560, 506, 514, 516, 517
See application file for complete search history.

(56) References Cited

U.S. PATENT DOCUMENTS

| | | | | |
|---|---|---|---|---|
| 4,806,377 A | * | 2/1989 | Ellis et al. | 426/549 |
| 4,985,262 A | | 1/1991 | Camire | |
| 5,505,978 A | | 4/1996 | Roy | |
| 7,297,357 B2 | * | 11/2007 | Akimoto et al. | 426/448 |

* cited by examiner

*Primary Examiner* — Lien T Tran
(74) *Attorney, Agent, or Firm* — Colin P. Cahoon; Celina M. Orr; Carstens & Cahoon, LLP

(57) ABSTRACT

A method improving the textural attributes of baked snack foods. The method comprises mixing ingredients, extruding the ingredients to form a collet, hydrating the collet with a hydrating fluid to form a hydrated collet, and baking the hydrated collet. The hydrating fluid can comprise water, oil, a surfactant, an emulsifier, and mixtures thereof. In one embodiment the baking comprises utilizing an impingement oven. The method discussed herein more resembles the taste and texture of a fried product than does prior art baking methods.

12 Claims, 3 Drawing Sheets

METHOD FOR IMPROVING THE TEXTURAL ATTRIBUTES OF BAKED SNACK FOODS

BACKGROUND OF THE INVENTION

1. Technical Field

The present invention relates to a method for improving the textural attributes of baked snack foods.

2. Description of Related Art

Fried snack foods are very popular with consumers. Fried snack foods often have a distinguishable texture and taste. Recently, as the consumer becomes more health conscious, baked snack foods have been developed as a healthier alternative to fried snack foods. However, many baked snack foods have been unable to mimic the texture and taste associated with traditional fried products. Consequently, it is desirable to manufacture a low-fat baked product which more resembles a traditional fried snack food.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicants' invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
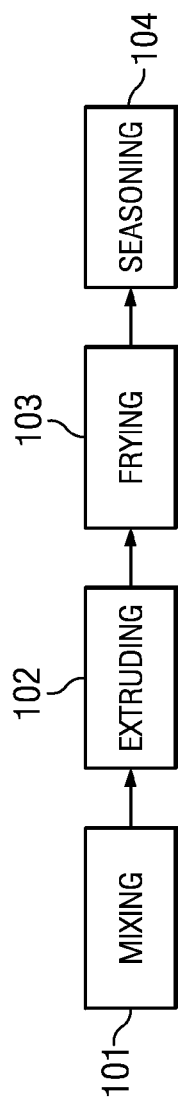
FIG. 1 is a process flow chart of a frying method known in the prior art.

FIG. 1 is a flow chart of a frying method known in the prior art. The first step is mixing 101. The material can comprise any starch. Thereafter the product is extruded 102 to form a collet. Thereafter the extruded collet is fried 103 to a desired moisture content. Frying provides rapid heat transfer and allows for fast moisture removal. Often the collet is fried to a moisture content of about 1.5%. Thereafter the fried collet is optionally seasoned 104.

Figure 2:
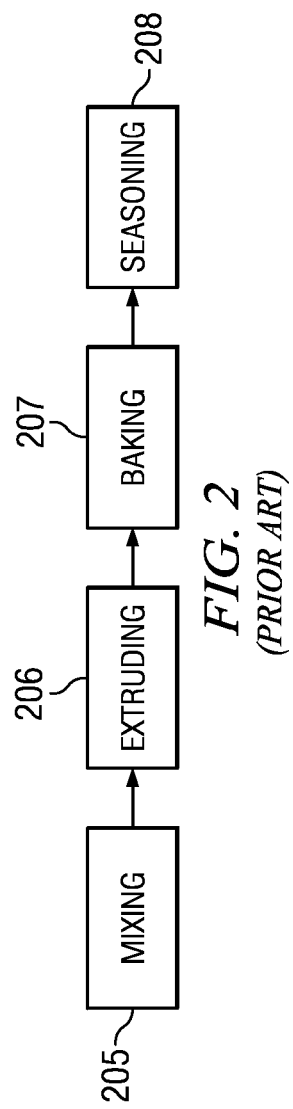
FIG. 2 is a process flow chart of a baking method known in the prior art.

FIG. 2 is a flow chart of a baking method known in the prior art. The first step is mixing 205, followed by extruding 206. Thereafter the extruded collet is baked 207 until a desired moisture content is obtained. The collet can be baked between about 200° F. and about 350° F. Thereafter, the baked collet is optionally seasoned 104.

Figure 3:
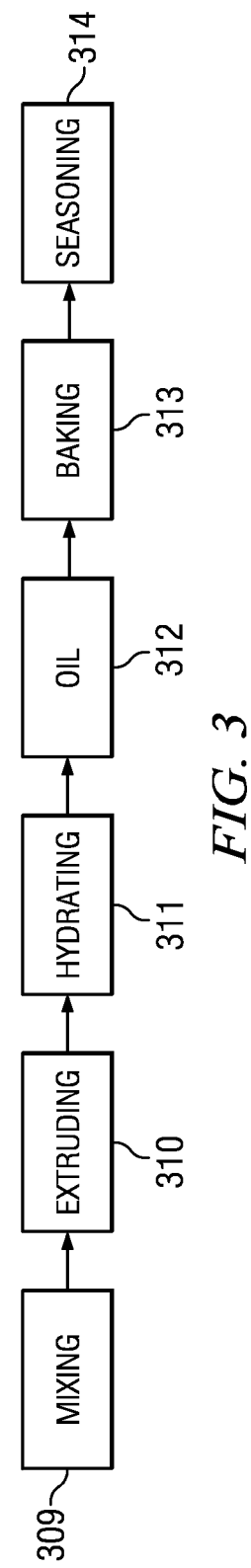
FIG. 3 is a process flow chart of one embodiment of the instant invention.

FIG. 3 is a flow chart of one embodiment of the instant invention. The first step is the mixing step 309. The mixing step 309 can comprise a variety of ingredients. In one embodiment the mixing step 309 comprises mixing a masa-based product to form a dough. The mixing step 309 can comprise the addition of water, emulsifiers, surfactants, corn, corn products, potato, potato products, and other ingredients used to make snack foods.

The mixing 309 can take place separately or it may take place simultaneously with the extruding step 310. The extruding step 310 can comprise any extruder known in the art. In one embodiment the extruding step 310 comprises high shear extrusion at high temperatures. In one embodiment the temperature in the extruder ranges from about 250° F. to about 350° F. In another embodiment the temperature in the extruder ranges from about 275° F. to about 290° F. After extrusion the extruded material can be cut to form collets. The moisture content of the extruded collet will vary depending on the initial ingredients. In one embodiment comprising corn masa, the moisture content ranges from about 11 to about 12%. In other embodiments the moisture content after extrusion ranges from about 5 to about 20%. It has been found in one embodiment that to obtain a good collet, the moisture content within the extruder must be below about 20%. In one embodiment the moisture content within the extruder must be below 16.5%.

After extrusion, the collet is hydrated in a hydrating step 311. The hydrating step increases the moisture content of the collet by adding a hydrating fluid. As discussed, the moisture content of the ingredients within the extruder is limited, thus, if additional moisture is to be added it must be added after extrusion. A hydrating fluid refers to a fluid comprising water which is added to an extruded collet before baking, frying, or other processing. As will be discussed in more detail below, the hydrating fluid can comprise water, oil, additives, surfactants, etc. The hydrating step can comprise virtually any method or device which applies a fluid. For example, in one embodiment the collets are dipped in the hydrating fluid. In another embodiment the collets are sprayed with the hydrating fluid. The hydrating fluid can comprise virtually any temperature. In one embodiment the hydrating fluid is applied at ambient temperature whereas in other embodiments the hydrating fluid is applied at temperatures as high as 212° F. In one embodiment the hydrating fluid comprises applying steam.

The amount of hydrating will be dependent upon a variety of factors. In one embodiment hydrating fluid is added from about 1 to about 60% by weight of the collet. In another embodiment hydrating fluid is added from about 1 to about 30% by weight of the collet, whereas in a further embodiment hydrating fluid is added from about 1 to about 15% by weight of the collet.

Applicants have found that the hydrating step 311 has a surprising effect on the texture of the baked product. Applicants discovered that as the moisture content of the collet before baking increased, the crunchiness of the baked product likewise increased. Further, in one embodiment the size of the baked product decreases as the amount of moisture added before baking increases.

Table 1 below illustrates the findings of a comparison study conducted to determine the effect of water. Table 1 illustrates three cells: a control, cell 1, and cell 2. All three cells comprised the same initial composition comprising corn masa and water. Thus, all cells comprised the same ingredients and were extruded under the same conditions. Further, all cells were baked at 350° F. to a moisture content of about 1.5%. The control did not comprise a hydrating step. After cell 1 was extruded, water was added to the collet in an amount of 30 grams of water per 100 grams of collet. Cell 2 was hydrated in a similar fashion in an amount of 60 grams of water per 100 grams of collet.

TABLE 1

|  | Hydration | Crunch | Size |
|---|---|---|---|
| Control | N/A | Standard | Standard |
| Cell 1 | 30 g water/100 g | Increased crunch | Decreased size |
| Cell 2 | 60 g water/100 g | Highest crunch | Smallest size |

The three samples were then analyzed by a panel. It was determined that cell 1 most resembled the crunch and texture of the fried snack chip. Further cell 1 had increased crunch over the control. Cell 2 had the highest crunch but had decreased in size.

Without being limited to theory, it is believed that due to the high shear and short residence time in the extruder, not all of the starch is damaged or "cooked." This undamaged or partially undamaged starch is still available and when exposed to water it swells. This starch swells even further during baking It is theorized that some strands that leach out of the damaged starch may align so as to create a more dense cell structure compared to the foamy structure produced by the extruder. The result of this is increased crunch.

Furthermore, cooking starch requires a temperature above about 140° F. (60° C.) and excess water. Thus, by adding excess moisture during the hydrating step 311, the starch can be more effectively cooked in the subsequent baking step. Additionally, by increasing the moisture content of the extruded collet, the specific heat of the collet material is increased to allow for more efficient heat transfer.

Furthermore, it is believed that the hydrating changes the surface cellular structure from a porous to a closed cell structure. Without being limited to theory, it is believed this results from the slickness created on the surface of the collet due to the hydration as well as the rubbing action between the pieces during the mixing action. It is believed that this rubbing action smoothes the surface and closes the pores which prevents oil pick-up in subsequent baking.

The hydrating step 311 provides for a way to control texture and size of an extruded starch product without adversely affecting the nutritional value of the product. Put differently, the hydrating step allows the textural attributes of the baked snack food to better resemble the textural attributes of the fried snack food.

It has been found that in some embodiments the hydrated collets have increased stickiness. This increased stickiness has several benefits. One such benefit is the ability to better adhere ingredients such as spices or seasonings to the surface of the collet. This increased adherence also provides for the addition of starches, seeds, or other ingredients that can enhance the taste or nutritional qualities of the snack food.

After the hydrating step 311 the hydrated collet is subjected to an optional oil step 312. The oil can comprise virtually any type of oil. In one embodiment, the oil comprises corn or vegetable oil. As discussed, the hydrating step 311 often results in increased stickiness which offers many advantageous effects. However, one effect that is a disadvantage in some embodiments is that the hydrated collets tend to stick or clump to one another. This clumping can undesirably affect the cooking and seasoning steps. As an example, if product is clumped together then seasoning cannot be sufficiently applied to the entire surface area of the baked collet. To overcome this stickiness, oil can be applied to the collets. The oil can be applied in any method known in the art or previously discussed. Thus, the oil can be sprayed onto the collets. Further, the oil can be added to the hydrating fluid so that the oil and water are applied simultaneously. In one embodiment the hydrating fluid comprises a mixture comprising oil, water, and a surfactant. The hydrating fluid can also comprise starchy base materials such as cooked or pre-cooked flours such as maseca cornmeal. The hydrating fluid can also comprise flavor enhancers which will affect the flavor of the final product. For example, the hydrating fluid can also comprise soluble protein fraction such as free amino acids to improve the flavor and the nutritional quality of the product. Furthermore, if the snack food product is desired to comprise a cheese flavor, then cheese flavoring can be mixed into the hydrating fluid. Other flavors such as garlic, butter, ranch, etc. can also be utilized. Thus, the hydrating fluid, while affecting the texture of the baked product, can also be used to control the flavor and nutritional quality of the product.

In one embodiment the flavor enhancer comprises a salt enhancer which enhances the flavor of salt in the product. Thus, by utilizing a salt enhancer in the hydrating fluid, the amount of salt in the post-baking seasoning step can be reduced. In one embodiment sodium is reduced by about 15 to about 30%. In another embodiment, sodium is reduced by about 25%.

In one embodiment the hydrating fluid comprises about 10-100% by weight water. In another embodiment the hydrating fluid comprises about 30 to about 60% by weight water. In one embodiment the hydrating fluid comprises about 0 to about 80% by weight oil. In another embodiment the hydrating fluid comprises about 10-60% by weight oil. In one embodiment the hydrating step 311 comprises adding water in the amount of about 10-25% by weight of the collet. In one embodiment the hydrating step 311 comprises adding water in the amount of about 15% by weight of the collet. In one embodiment the hydrating step 311 comprises adding water in the amount of about 17% by weight of the collet. In one embodiment the hydrating step 311 comprises adding oil in the amount of about 8-15% by weight of the collet, whereas in another embodiment oil is added in the amount of about 11% oil by weight of the collet. In one embodiment water is added by about 15% by weight of the collet and oil is added in the amount of about 11% by weight of the collet. In another embodiment water is added by about 17% by weight of the collet and oil is added in the amount of about 11% by weight of the collet.

Oil also has an effect on the taste of the baked product. When collets are fried the oil adds a distinctive flavor. Likewise, by adding oil to the collet before baking, the result is improved flavor characteristics of the baked base. Thus, the fried oil flavor can be obtained by baking the oil. In one embodiment the oil comprises at least one antioxidant which prevents oxidation of the oil during the subsequent baking step. In one embodiment the oil comprises a natural antioxidant.

The amount of oil in a collet affects the amount of fat and oil in the final baked product. Thus, the final fat content of the baked product can be controlled by controlling the amount of oil in the hydrating fluid. In one embodiment, the final fat content of the baked product before seasoning ranges from about 0 to about 25%. In another embodiment the final fat content of the baked product ranges from about 0 to about 15% fat.

It should be noted that the hydrating step 311 can occur directly after extrusion or may occur several days or weeks after extrusion. Extruded collets have been stored for weeks, hydrated during the hydrating step 311, and subsequently baked 313 to form a desirable product. Thus, collets can be manufactured, stored, and shipped to remote locations before hydration. This increases manufacturing flexibility.

After the hydrating step 311 is complete, the hydrated collet is then baked during a baking step 313. The baking 313 can take place in any oven known in the art. As previously discussed, the product can be baked from about 200° F. to about 450° F. until a desired moisture content has been reached. In one embodiment the hydrated collet is baked until a moisture content of about 1.5%. In one embodiment the hydrated collet is baked in a traditional convection oven for about 60-80 seconds. In one embodiment the hydrated collet is baked in an impingement oven for about 40 to about 60 seconds.

In one embodiment the baking step 313 comprises utilizing an impingement oven. An impingement oven overcomes many of the shortcomings of traditional convection ovens. Conventional ovens offer slow cooking as the cool air around the product must first be penetrated and heated before the product is cooked. Convection ovens decrease this problem slightly by moving the air to increase this heat transfer. An impingement oven, in one embodiment, injects high velocity air at the product to strip away the cool air surrounding the product. Accordingly, in one embodiment the impingement oven comprises a heat transfer coefficient 2.5 to 3 times greater than a convention oven. This allows for rapid heat transfer which better resembles the rapid heat transfer found in frying.

EXAMPLES

Three samples were analyzed. All three samples comprised corn masa and water. The first sample was extruded and fried. The first sample did not comprise a hydrating step. The second sample was extruded and thereafter baked in a convection oven. The second sample did not comprise a hydrating step. The third sample was extruded, hydrated, and thereafter baked in an impingement oven. The hydrating step comprised adding water in an amount of about 15% by weight of the collet and oil in an amount of about 11% by weight of the collet. All samples were dehydrated to a moisture content of about 2%. The samples were then analyzed for texture. The samples were inserted into a TAX-T2 texture analyzer manufactured by Texture Technologies Corp., Scarsdale, N.Y., USA. The testing utilized a 1 mm puncture probe, a 200 mm/second test speed and a 10 mm distance. Table 2 below illustrates the results.

TABLE 2

| Sample | Force to Break (g) |
| --- | --- |
| 1 (Fried) | 383.71 |
| 2 (Baked) | 372.78 |
| 3 (Hydrated then baked) | 398.02 |

As can be seen the sample that was hydrated required a larger force to break than the baked or fried samples. Thus, the hydrated product had a crunch which was greater than the fried product or the baked product without the hydrating step.

Samples from fried, baked, and hydrated product were also subjected to CT scanning As noted above, all samples comprised cornmeal and water, and were extruded under identical conditions. The first sample was fried. The second sample was hydrated with water and oil and subsequently baked in a convection oven. The hydrating step comprised adding water in an amount of about 15% by weight of the collet and oil in an amount of about 11% by weight of the collet. The third sample was hydrated with the same hydrating fluid as the second sample but was subsequently baked in an impingement oven. Samples were obtained and a very small cross-sectional slice was analyzed using a CT Scanner.

Figure 4:
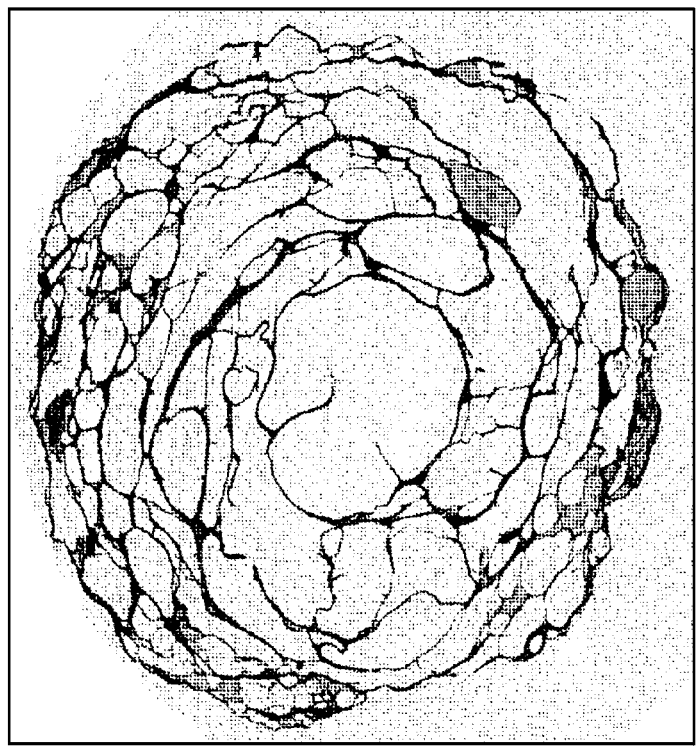
FIG. 4 is a cross-sectional CT scan of a fried product.

FIG. 4 is a cross-sectional CT scan of a fried product. FIG. 4 illustrates expanded pores in the outer layer. These pores comprise many pockets of air. The outer portion of the pores comprise oil, cornmeal, and water. The shaded grey portions beneath the surface illustrate the presence of oil. This illustrates the depth which the oil has penetrated the product. The light grey masses illustrate pockets of oil.

Figure 5:
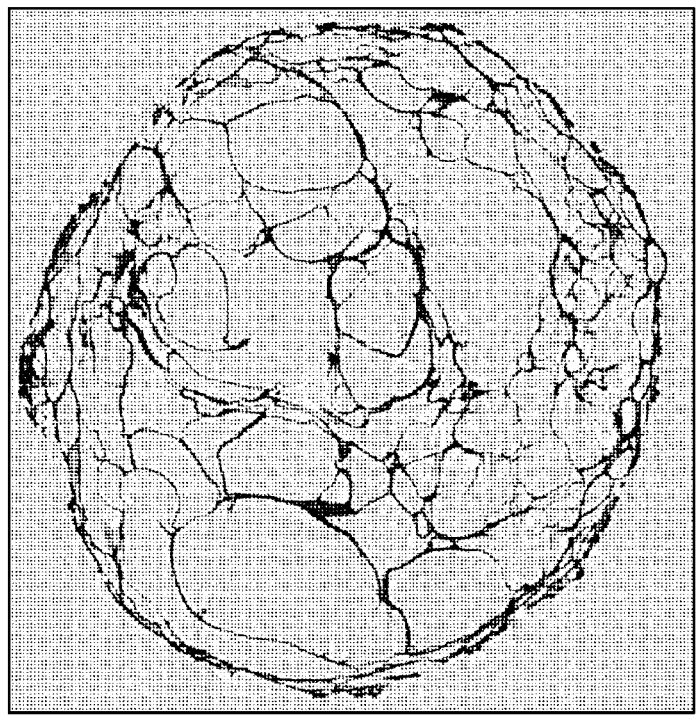
FIG. 5 is a cross-sectional CT scan of the hydrated collet baked in a convection oven in one embodiment.

FIG. 5 is a cross-sectional CT scan of the hydrated collet baked in a convection oven in one embodiment. The hydrating step comprised adding water in an amount of about 15% by weight of the collet and oil in an amount of about 11% by weight of the collet. FIG. 5 reveals that the baked product had compressed pores in the outer layers compared to the pores of the fried product in FIG. 4.

Figure 6:
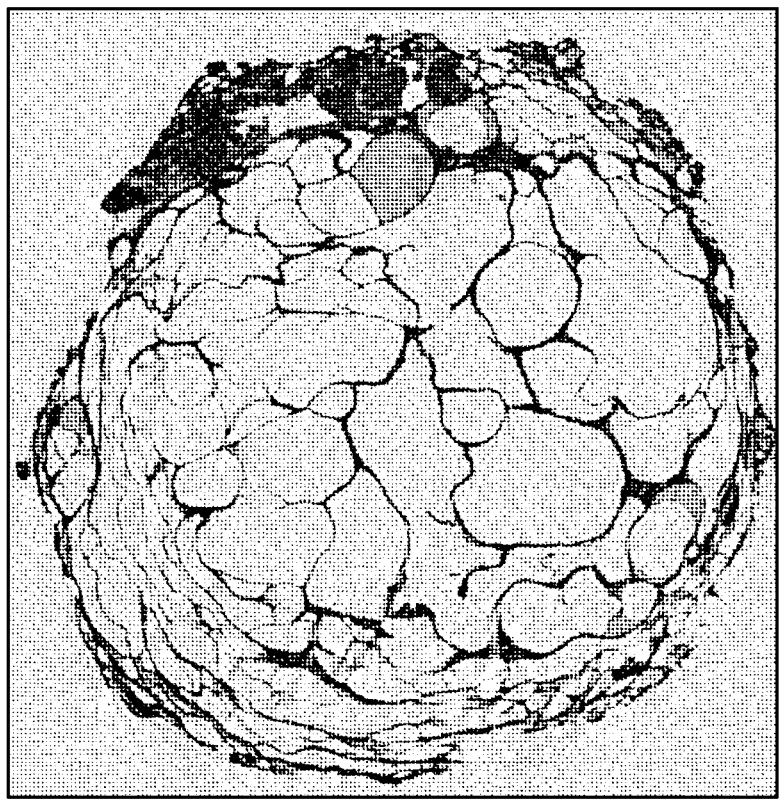
FIG. 6 is a cross-sectional CT scan of a hydrated collet baked in an impingement oven in one embodiment.

FIG. 6 is a cross-sectional CT scan of a hydrated collet baked in an impingement oven in one embodiment. The hydrating step comprised adding water in an amount of about 15% by weight of the collet and oil in an amount of about 11% by weight of the collet. This figure illustrates compressed and shrunken pores in the outer layers. This product had more compressed and shrunken pores than the fried product and the convection oven baked product. Also illustrated are some dense outer regions of cornmeal and oil.

FIGS. 5 and 6 illustrate that the hydrating step solubilizes the cornmeal which creates a layer of fluid starch on the outer portions of the product. This results in a collapsing of the pores resulting in a denser outer layer. This denser outer layer attributes to the increased crunch associated with a hydrated then baked product.

Further, comparing FIG. 6 to FIG. 5 it can be seen that the product baked in the impingement oven has more compressed and shrunken pores compared to the pores of the product baked in the convection oven. Without being limited to theory it is believed that the intensity of the thermal treatment of the impingement oven causes the pores to collapse at a quicker rate than the convection oven. Further, it is believed that the air bearing down upon the product in an impingement oven cause the pores to collapse. When the pores collapse, they have a shingle effect in that they collapse on adjacent pores causing additional pores to collapse. Accordingly, these figures illustrate the effect that the impingement oven has on the collet.

The samples were also analyzed to determine the pore size distribution. An X-RAY Computational Tomography Scanning was utilized to analyze the pore size. As above, all three products comprised cornmeal and water, and were extruded at identical conditions. The first sample was fried. The second sample underwent a hydrating step wherein the hydrating step comprised adding water in an amount of about 15% by weight of the collet and oil in an amount of about 11% by weight of the collet and was subsequently baked in a convection oven. The third sample underwent the same hydrating step but was baked in an impingement oven. The results are illustrated in Table 3 below.

TABLE 3

| Product | Average Pore Size, μm | Pore Size Range, μm | % Porosity |
| --- | --- | --- | --- |
| Fried | 875 | 21-1729 | 71 |
| Convection Oven | 709 | 20-1397 | 74 |
| Impingement Oven | 648 | 20-1276 | 66 |

As seen, both baked products had smaller average pore sizes compared to the fried product. Further, both baked products had a narrower range of pore sizes compared to the fried product. Additionally, the impingement oven had smaller average pore sizes and a narrower range of pore sizes than the convention oven. As stated above, it is believed this is due to the intensity of the thermal treatment of the impingement oven as well as the force of the air in the impingement oven. As stated, a collapsed pore results in increased crunch.

Table 3 also illustrates the percent porosity. This is calculated by dividing the total pore volume by the total piece volume. As can be seen, the impingement oven results in decreased porosity compared to the convection and fried products.

While the invention has been particularly shown and described with reference to a preferred embodiment, it will be understood by those skilled in the art that various changes in form and detail may be made therein without departing from the spirit and scope of the invention.

ADDITIONAL DESCRIPTION

1. A method for manufacturing a baked snack food, said method comprising:
   a) mixing ingredients;
   b) extruding said ingredients to form a collet;
   c) hydrating said collet with a hydrating fluid to form a hydrated collet;
   d) baking said hydrated collet.
2. The method according to any preceding clause wherein said hydrating fluid comprises water.
3. The method according to any preceding clause wherein said hydrating fluid comprises oil.
4. The method according to clause 3 wherein said oil comprises at least one anti-oxidant.
5. The method according to any preceding clause wherein said hydrating fluid comprises a surfactant.
6. The method according to any preceding clause wherein said hydrating of step c) comprises spraying said hydrating fluid.
7. The method according to any preceding clause wherein said hydrating step comprises adding a hydrating fluid from about 1 to about 60% by weight of the collet.
8. The method according to any preceding clause wherein said hydrating step increases the moisture content of said collet.
9. The method according to any preceding clause wherein said collet has a moisture content of about 11 to about 13% after said extruding of step b) and before said hydrating of step c).
10. The method according to any preceding clause wherein said collet has a moisture content of about 10-60% after said hydrating of step c) and before said baking of step d).
11. The method according to any preceding clause wherein said hydrating fluid comprises steam.
12. The method according to any preceding clause wherein said hydrating fluid comprises a soluble protein fraction.
13. The method according to any preceding clause wherein said baking of step d) comprises utilizing an impingement oven.
14. The method according to any preceding clause wherein said baking of step d) comprises utilizing a convection oven.
15. The method according to any preceding clause wherein said mixing of step a) comprises mixing corn masa and water.
16. The method according to any preceding clause wherein said mixing of step a) consists of mixing corn masa and water.
17. A snack food product made by the method of claim 1.

We claim:

1. A method for manufacturing a baked snack food, said method comprising:
   a) mixing ingredients, wherein said ingredients comprise corn masa and water;
   b) extruding said ingredients to form a collet;
   c) hydrating said collet with a hydrating fluid to form a hydrated collet wherein said hydrating fluid comprises steam;
   d) baking said hydrated collet, wherein said collet has a moisture content of about 10-60% after said hydrating of step c) and before said baking of step d).
2. The method of claim 1 wherein said hydrating fluid comprises oil.
3. The method of claim 2 wherein said oil comprises at least one anti-oxidant.
4. The method of claim 1 wherein said hydrating fluid comprises a surfactant.
5. The method of claim 1 wherein said hydrating of step c) comprises spraying said hydrating fluid.
6. The method of claim 1 wherein said hydrating fluid comprises about 1 to about 60% by weight of the collet.
7. The method of claim 1 wherein said hydrating step increases the moisture content of said collet.
8. The method of claim 1 wherein said collet has a moisture content of about 11 to about 13% after said extruding of step b) and before said hydrating of step c).
9. The method of claim 1 wherein said hydrating fluid comprises a soluble protein fraction.
10. The method of claim 1 wherein said baking of step d) comprises utilizing an impingement oven.
11. The method of claim 1 wherein said baking of step d) comprises utilizing a convection oven.
12. The method of claim 1 wherein said mixing of step a) consists of mixing corn masa and water.

* * * * *